United States Patent [19]
Yang

[11] Patent Number: 5,304,886
[45] Date of Patent: Apr. 19, 1994

[54] PRINTED CIRCUIT MOTOR

[76] Inventor: Tai-Her Yang, 5-1 Taipin Street, Si-Hu Town, Dzan-Hwa, Taiwan

[21] Appl. No.: 944,046

[22] Filed: Sep. 11, 1992

Related U.S. Application Data

[60] Continuation-in-part of Ser. No. 598,260, Oct. 15, 1990, abandoned, which is a division of Ser. No. 258,088, Oct. 17, 1988, Pat. No. 4,962,583, which is a continuation of Ser. No. 426,188, Sep. 28, 1982, abandoned.

[51] Int. Cl.⁵ .................................. H02K 1/22
[52] U.S. Cl. .................... 310/268; 310/49 R; 310/68 B; 310/154; 310/198; 310/208; 310/DIG. 6; 250/231.14; 324/175
[58] Field of Search ............. 310/232, 237, DIG. 6, 310/154, 258, 208, 148, 49 R, 248, 68 B, 268; 318/480, 696; 324/175; 250/231.14, 231.15, 231.16

[56] References Cited

U.S. PATENT DOCUMENTS

| | | | |
|---|---|---|---|
| Re. 25,305 | 12/1962 | Haydon | 310/DIG. 6 |
| 3,038,138 | 6/1962 | Peterson | 310/232 |
| 3,737,697 | 6/1973 | Kitamori et al. | 310/268 |
| 3,748,566 | 7/1973 | Brembs | 318/696 |
| 4,544,915 | 10/1985 | Wieme | 250/231.14 |
| 4,962,583 | 10/1990 | Yang | 29/568 |

FOREIGN PATENT DOCUMENTS

| | | | |
|---|---|---|---|
| 0208123 | 12/1989 | European Pat. Off. | |
| 0149807 | 11/1979 | Japan | 310/DIG. 6 |

Primary Examiner—R. Skudy
Attorney, Agent, or Firm—Leonard Bloom

[57] ABSTRACT

A stepping motor having a printed circuit rotor including a first printed circuit on one side of the rotor formed in a plurality of spiral coil windings, and a second printed circuit on the other side of the rotor formed in an equal number of like coil windings, the coil windings on one side being 90° out of phase with those on the opposite side. The motor also includes a slip-ring arrangement for delivering pulsed DC power alternately to the first and second printed circuits for driving the rotor in a step-wise manner.

5 Claims, 3 Drawing Sheets

| STEP | PRINTED CIRCUIT 12 | PRINTED CIRCUIT 13 |
|---|---|---|
| 1 | + | 0 |
| 2 | 0 | + |
| 3 | − | 0 |
| 4 | 0 | − |
| 5 | + | 0 |
| ⋮ | | |

PRINTED CIRCUIT MOTOR

CROSS-REFERENCE TO RELATED APPLICATION

The present application is a continuation-in-part of U.S. patent application Ser. No. 598,260 filed Oct. 15, 1990, now abandoned which is a divisional application of U.S. patent application Ser. No. 258,088 filed Oct. 17, 1988, which is in turn a continuation of Ser. No. 426,188 filed Sep. 28, 1982 now abandoned.

BACKGROUND OF THE INVENTION

1. Field of the Invention

The present invention relates to electric machines and, more particularly, to a DC stepping motor incorporating a printed circuit rotor.

2. Description of the Background

Simplicity and standardization are the basic prerequisites for tooling and machinery designed for mass production of industrial products. This is especially true of automatic processing systems where the operative component parts must have the flexibility to carry out different processing procedures using different work-pieces.

For example, a properly designed automatic processing system can complete a variety of operations such as lathe cutting, drilling, planning, milling, abrading, and boring. Moreover, the system should be capable of multiple sequential operations and/or multiple concurrent or combined operations.

Computer or processor-controlled systems provide the necessary flexibility. However, a precision electromechanical interface is required in such systems to convert software commands into mechanical movement. Typically, precision electric motors are used for this purpose.

For example, U.S. Pat. No. Re. 25,305 reissued Dec. 25, 1962, shows a commutating motor with an axial (or disk-type) structure which helps in reducing the size of the motor. The motor has a disk-type rotor with a number of coiled windings located radially about the disk. As shown in FIG. 3, the coiled armature windings 11 are alternately positioned on both sides of the disk 13, and all the windings 11 are connected in series via commutating segments 7 and 12. A stator is provided which includes two pairs of bi-polar magnets 17 and 18. Each pair of bi-polar stator magnets 17 and 18 flanks the disk rotor 13 and conforms to the armature windings thereon, and the two pairs are located 180° apart. As the disk rotor 13 rotates, brushes 19 and 20 contact the commutating segments 7 and 12 thereby directing a DC voltage to the proper armature windings. The resulting continuous drive characteristics resemble those of a conventional DC motor, i.e., the speed is highly dependant on the DC input voltage and the load.

U.S. Pat. No. 3,737,697 issued to Kitamor et al. shows another example of a disk-type commutating motor. In this case, a printed circuit rotor is disclosed to further reduce the size of the motor.

Although the disk-type commutating motors as described above provide compact and powerful electromechanical conversion, they are continuous drive motors and are incapable of instantaneous starting and stopping. Hence, disk-type commutating motors are often incapable of the precise intermittent control needed computer or processor-controlled manufacturing systems.

Stepping motors were developed to overcome the above-described problems. Stepping motors may be controlled to execute and maintain a fixed angular displacement. This is usually accomplished by pulsed control signals from a central processor. However, unlike commutating motors, stepping motors are reluctance machines in which a permanent magnet rotor typically strives to align itself with an electrically-excited stator to minimize reluctance. Stepping motors (like commutating motors) may be constructed in an axial form, but this requires a permanent magnet stator and electrically-excited rotor. This in turn requires some means to convey the pulsed DC control signals to the rotor windings during rotation, and it requires a fixed arrangement of rotor windings and stator magnets to insure precise and continued incremental rotation with each additional control pulse.

It would be greatly advantageous to employ a disk-type rotor as in the Haydon Re. '305 patent in a stepping motor for machine tool applications as shown and described in the parent U.S. patent application Ser. No. 258,088 filed Oct. 17, 188 (which is, in turn, a continuation of Ser. No. 426,188 filed Sep. 28, 1982).

The Applicant is aware of European Patent Application 86107389.0 (Publication No. 0208213). This application claimed a priority based on U.S. Ser. No. 426,188 (the parent of the present application). A copy of this reference is provided herewith.

SUMMARY OF THE INVENTION

It is an object of the present invention to provide a printed-circuit stepping motor capable of precise stepwise rotation under computer or processor control.

It is another object of the invention to provide a cost effective stepping motor having a printed circuit disk-type rotor for machine tool applications.

It is still another object to provide an arrangement of printed circuit rotor windings and a means for conveying pulsed control signals thereto to insure precise and continued incremental rotation with each additional control pulse.

In accordance with the above-described and other objects, the present invention provides a printed circuit stepping motor including a stator and a disk-type printed circuit rotor. The stator further includes a housing, a plurality of permanent magnets mounted within the housing on one side of the rotor and a ring-shaped stator core mounted within said housing on the other side of the rotor. The rotor further includes an axle rotatably seated in the stator housing, a flat insulating disk attached to the axle, and two printed circuits on opposing sides of the disk. A first printed circuit is configured in a plurality of coil windings circumferentially arranged on one side of the flat insulating disk, and the coil windings are interconnected to generate poles of alternate polarities when power is applied to said first printed circuit. A first pair of conductive slip rings is also provided on the insulating disk and is connected to the first printed circuit for conveying input power thereto. A second printed circuit is likewise configured in a plurality of coil windings circumferentially arranged on the other side of the flat insulating disk, and these coil windings are likewise interconnected to generate poles of alternate polarities when power is applied to the second printed circuit. Each coil winding of the second printed circuit is angularly displaced midway between adjacent coil windings of said first printed circuit. In addition, a second pair of conductive slip rings are provided on the insulating disk and are connected to the second printed circuit for conveying input power thereto. A first pair of brushes is mounted on the stator for maintaining continuous electrical contact with the first pair of slip rings despite rotation of said rotor. A second pair of brushes is mounted on the stator for maintaining continuous electrical contact with the second pair of slip rings. In operation, the rotor will rotate in a stepwise manner when a DC pulse input is sequentially applied to the first printed circuit and then to the second printed circuit through the respective first and second pair of brushes.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT(S)

Figure 1:
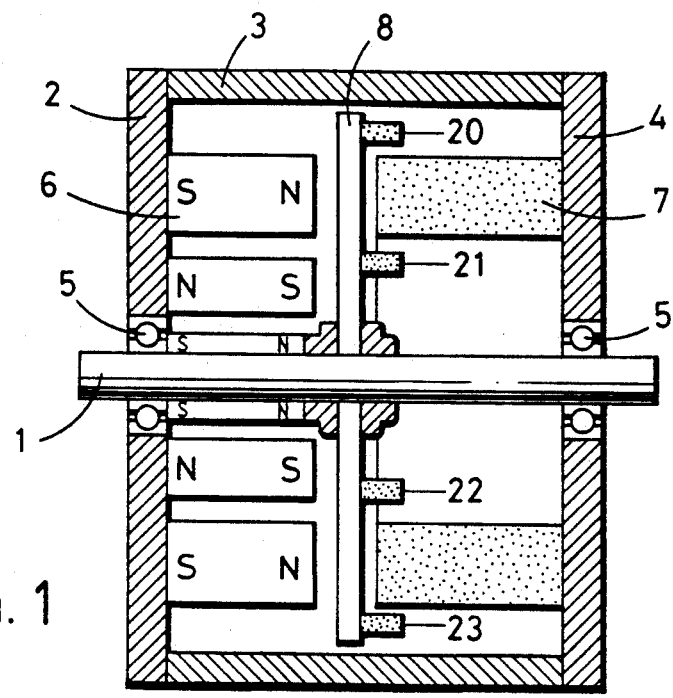
FIG. 1 is a side cut-away view of a printed circuit stepping motor showing the internal structure according to the present invention.

FIG. 1 shows the internal structure of a printed circuit stepping motor according to the present invention.

The motor includes a stator and a rotor. The stator further includes a cylindrical (or disk-type) housing 3 with end panels 2, 4, a plurality of permanent magnets 6 mounted within housing 3 on one side, and a ring-shaped stator core 7 mounted within housing 3 on the opposite side.

A rotor is mounted in the stator for rotation therein. The rotor further comprises an axle 1 enclosed within the stator housing 3 and rotatably seated in end panels 2, a flat insulating disk 8 attached to the axle 1 for rotation thereon. Disk 8 serves as a blank printed circuit board and is formed from any suitable insulating material.

Axle 1 is preferably mounted on a set of bearings 5 to ease rotation.

The disk 8 of the printed circuit rotor faces on one side a variable number of poles of permanent magnets 6 and faces on the other side the flat ring-shaped stator core 7 and is mounted for rotation between the magnets 6 and core 7.

Figure 2:
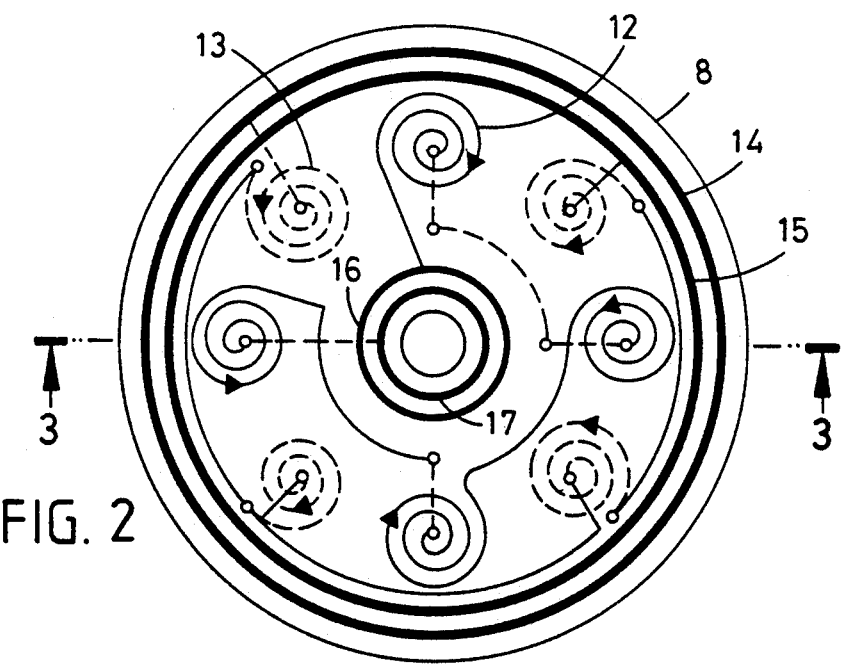
FIG. 2 is a front cut-away view of the printed circuit stepping motor of FIG. 1 with the spiral printed circuit rotor windings disposed on both sides of the disk-type rotor (those on the far side being shown by dotted lines)

As shown in FIG. 2, the rotor also includes a first printed circuit 12 etched or otherwise formed on one side of the insulating disk 8 and a second printed circuit 13 likewise formed on the opposite side of disk 8.

Both printed circuits 12 and 13 are configured in a plurality of coil windings circumferentially arranged around the periphery of the disk 8. The coil windings of printed circuits 12 and 13 are preferably spiral, although other selected geometric shapes may be used, and an equal number of coil windings are mounted on each side of the insulating disk 8 (herein shown to be four).

As shown in FIG. 2, the coil windings of the first printed circuit 12 are interconnected to generate poles of alternate polarities when power is applied thereto. Likewise, the coil windings of the second printed circuit 13 are interconnected to generate poles of alternate polarities. Each coil winding of the first printed circuit 12 is angularly displaced midway between adjacent coil windings of the second printed circuit 13.

A first pair of conductive slip rings 14 and 15 (FIG. 2) is also provided on the disk 8 and is connected to the second printed circuit 13. As shown in FIG. 1, a first pair of brushes 20 and 23 are biased against the first pair of conductive slip rings 14 and 15 for maintaining electrical contact therewith during rotation of the rotor. A first pulsed DC input signal may be applied to the second printed circuit 13 through the respective first pair of brushes 20 and 23 and first pair of slip rings 14 and 15.

A second pair of conductive slip rings 16 and 17 (FIG. 2) are provided on disk 8 and are connected to the first printed circuit 12. As shown in FIG. 1, a second pair of brushes 21 and 22 is biased against the second pair of conductive slip rings 16 and 17 for maintaining electrical contact therewith during rotation of the rotor. A second pulsed DC input signal may be applied to the second printed circuit 12 through the respective first pair of brushes 21 and 22 and second pair of slip rings 16 and 17.

Figure 3:
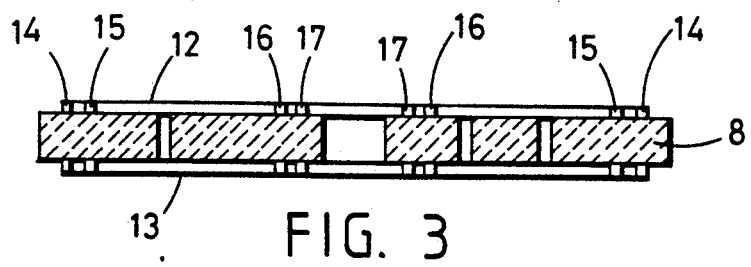
FIG. 3 is a cross-section view of the rotor 8 taken along the lines 3—3 of FIG. 2.

FIG. 3 shows a side cross-sectional view of the rotor including the insulating disk 8 with the superposed first printed circuit 12 and the underlying second printed circuit 13, the corresponding first pair of conductive slip rings 14, 15 and second pair of conductive slip rings 16, 17.

In operation of the above-described embodiment, a first pulsed DC control signal is applied to the first pair of brushes 20 and 23, and a second pulsed DC control signal is applied to the second pair of brushes 21 and 23 in order to drive the rotor in a stepwise manner.

In the exemplary eight-pole embodiment, the coil windings of the first printed circuit 12 are positioned to generate poles which are 90° out of phase with the poles generated by the coil windings of the second printed circuit 13. Since the phase difference between the magnetic poles of the first and second printed circuits 12 and 13 is 90°, the input power, applied to the respective first and second pairs of brushes 20,23 and 21,22 may be conventional step drive functions which are likewise 90° out of phase.

Figures 4A, 4B, 4C, 5:
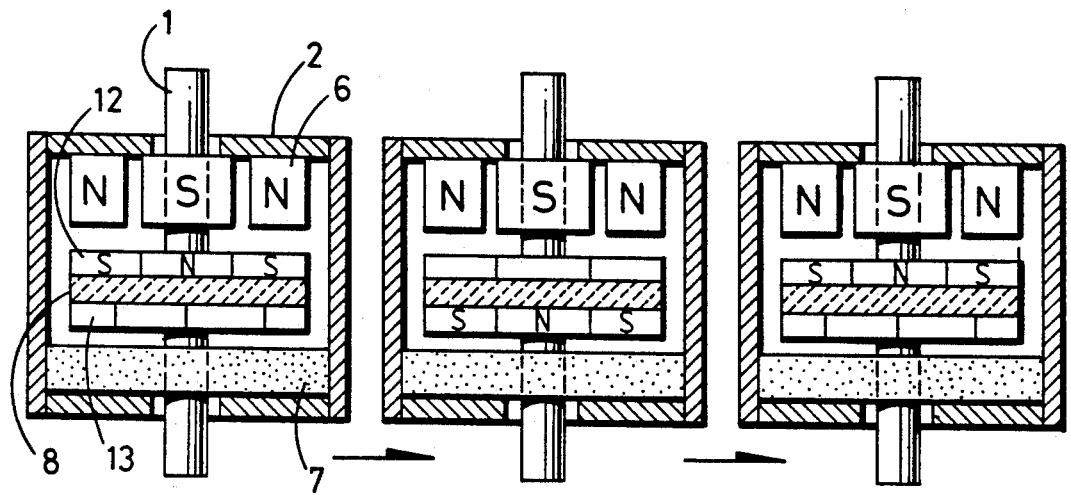
FIGS. 4A, 4B, and 4C are sequential drawings which illustrates the operating sequence (rotor displacement) of the printed circuit motor of FIGS. 1-3 in the context of three sequential cut-away cross sections as in FIG. 1.
FIG. 5 is a truth table of the input power sequence to the first printed circuit 12 and second printed circuit 13 which is needed to generate the operating sequence of FIG. 4.

An exemplary sequence of operation of a printed circuit motor according to the embodiments of FIGS. 1-3 is shown in FIGS. 4A-4C and FIG. 5 shows the pulsed DC input power sequence for generating the operating sequence of FIG. 4A-4C.

As shown in FIG. 5, a positive pulse (+) is initially applied (in STEP 1) to the first printed circuit 12. This excites the coil windings of the first printed circuit 12 with the polarities as shown in FIG. 4A, thereby bringing the corresponding coil windings into alignment with the corresponding permanent magnets 6 of opposite polarity. At this time, no power is applied to the coil windings of the second printed circuit 13. To rotate the rotor by 45°, the initial pulse is removed (0) in STEP 2 and a positive pulse (+) is applied to second printed circuit 13 on the other side of insulating disk 8. This excites the coil windings of the second printed circuit 13 with the polarities as shown in FIG. 4B, again bringing the corresponding coil windings into alignment with the opposite polarity permanent magnets 6 and effecting a 45° rotation. To rotate the rotor by another 45°, the positive pulse is again removed (0) in STEP 3 and a negative pulse (−) is applied to the coil windings of the first printed circuit 12. This excites the coil windings of the first printed circuit 12 with the polarities as shown in FIG. 4C, again bringing the corresponding coil windings into alignment with the opposite polarity permanent magnets 6 and effecting another 45° rotation. The rotor is rotated a full 180° by removing (0) the negative pulse in STEP 4 and applying a negative pulse (−) to the coil windings of the second printed circuit 13. The above-described sequence may be repeated to continue rotation in 45° increments. The increments may be varied by changing the number of coil windings and corresponding permanent magnets 6.

Figure 6:
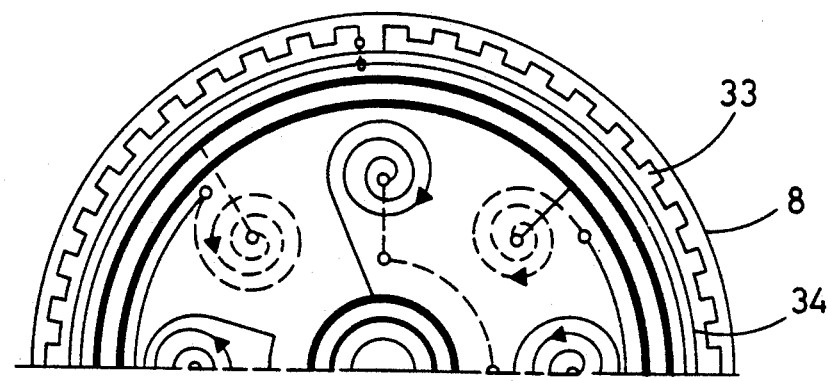
FIG. 6 is a partial front cut-away view of an alternative embodiment of the printed circuit stepping motor which additionally includes a pulse induction winding structure for allowing servo control.

FIG. 6 shows an alternative embodiment of the above-described printed circuit motor which is identical in all other respects to the embodiment of FIGS. 1-3, and which is additionally furnished with an auxiliary pulse signal generating winding 33 around the periphery of the rotor insulating disk 8. During rotation of the rotor, the auxiliary pulse signal generating winding 33 cuts the field of the permanent magnets 6 to induce a corresponding AC signal therein. An auxiliary slip ring 34 may be connected to the auxiliary pulse signal generating winding 33, and an auxiliary brush (not shown) may be biased into electrical contact with the auxiliary slip ring 34 to pick up the induced AC signal. Alternatively, an external sensing winding (not shown) may be mounted in inductive relation to the auxiliary pulse signal generating winding 33. Either way, the induced AC signal can be used as feedback for operating the printed circuit motor as a servomotor.

Figure 7:
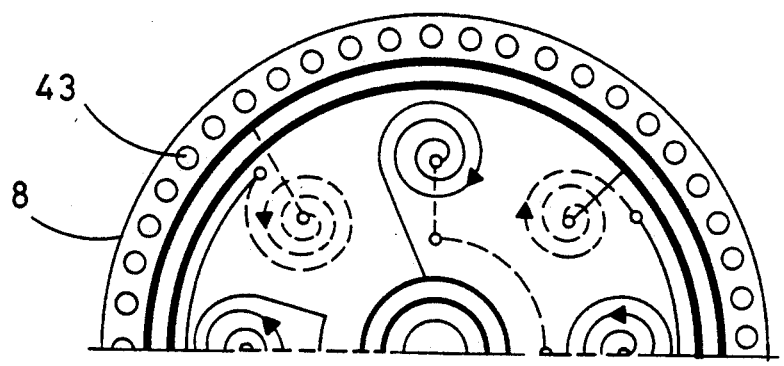
FIG. 7 is a partial front cut-away view of another alternative embodiment of the printed circuit stepping motor which additionally includes peripheral light-passing holes around the rotor for photocell sensing of angular position.

FIG. 7 shows a third alternative embodiment of the invention which is capable of servo operation by optical feedback. In this case, the auxiliary pulse signal generating winding 33 of FIG. 6 is replaced with one or more photocell encoder sensing holes 43 equally spaced about the outer rim of the disk 8. The holes 43 allow the intermittent passage of light during rotation of the rotor, and the frequency of the transiting light may be analyzed as feedback for operating the printed circuit motor as a servomotor.

Figure 8:
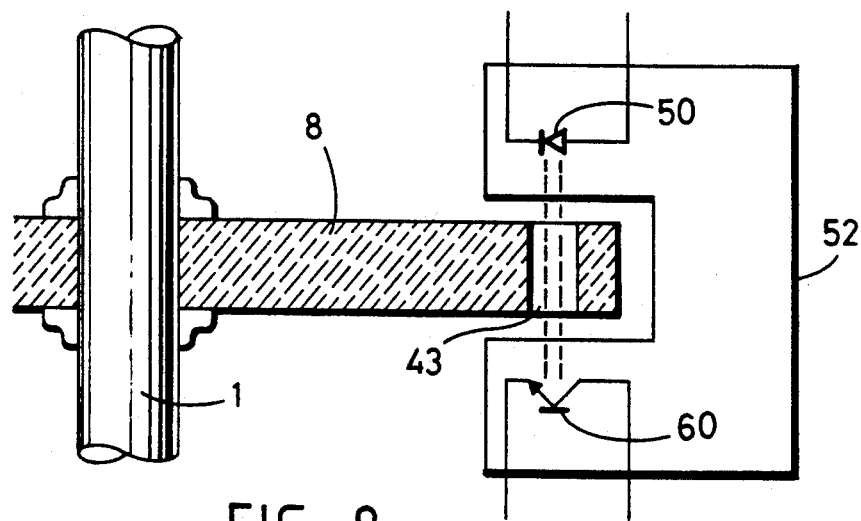
FIG. 8 is a perspective view showing a cross-section of the rotor of FIG. 7 in cooperation with a photocell sensing means (shown in schematic form).

FIG. 8 illustrates one possible optical feedback arrangement for use with the embodiment of FIG. 8. An external optical sensor 52 comprises a light emitting diode 50 positioned on one side of the rotor insulating disk 8 next to holes 43 and a photo-transistor 60 positioned on the other side of the rotor insulating disk 8 next to holes 43 for receiving the light emitted from LED 50 at a frequency determined by the rate of chopping by the rotating holes 43. The frequency of the output from photo-transistor 60 allows a determination of the angular position, speed, etc. of the printed circuit rotor when used as a servomotor.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A printed circuit stepping motor, comprising:
   a stator, said stator further including,
      a housing,
      a plurality of permanent magnets mounted within said housing on one side thereof,
      a ring-shaped magnet core mounted within said housing opposite said permanent magnets; and
   a rotor, said rotor further including,
      an axle rotatably seated in said housing,
      a flat insulating disk attached to said axle within said housing for rotation between said permanent magnets and said magnet core,
      a first printed circuit configured in a plurality of first coil windings, said first coil windings being evenly spaced apart and circularly arranged on one surface of said disk, said first coil windings being interconnected to generate poles of alternate polarities when current is applied to said first printed circuit,
      a first pair of conductive slip rings on said disk connected to said first printed circuit for supplying current to said first printed circuit;
      a second printed circuit configured in a plurality of second coil windings, said second coil windings being evenly spaced apart and circularly arranged on the surface of said disk opposite said one surface thereof, said second coil windings being interconnected to generate poles of alternate polarity when current is applied to said second printed circuit, each said second coil winding of said second printed circuit being angularly displaced midway between adjacent ones of said first coil windings of said first printed circuit, and
      a second pair of conductive slip rings on said disk connected to said second printed circuit for supplying current to said second printed circuit;
   a first pair of brushes mounted on said stator for maintaining continuous electrical contact with said first pair of slip rings;
   a second pair of brushes mounted on said stator for maintaining continuous electrical contact with said second pair of slip rings;
   whereby said rotor rotates in a stepwise manner when a DC pulse input is sequentially applied to said first printed circuit and then to said second printed circuit through said first and said second pair of brushes, respectively.

2. The printed circuit stepping motor according to claim 1, wherein the coil windings of said first and second printed circuits are spirally wound.

3. The printed circuit stepping motor according to claim 1, further comprising four coil windings in each of said first and second printed circuits.

4. The printed circuit stepping motor according to claim 1, wherein said rotor further comprises a pulse signal generating winding on the periphery of said insulating disk for cutting the magnetic field of said permanent magnets as said rotor rotates, thereby generating a signal by which an angular displacement of said rotor can be measured.

5. The printed circuit stepping motor according to claim 1, wherein said rotor further comprises a plurality of evenly-spaced holes around a periphery of said insulating disk for chopping light during rotation thereof, said chopped light serving as a feedback signal by which an angular displacement of said rotor can be measured.

* * * * *